Patented Mar. 16, 1948

2,437,894

UNITED STATES PATENT OFFICE 2,437,894

FUEL PRESSURE IGNITION CONTROL FOR BURNER SYSTEMS

William A. Ray, Glendale, Calif., assignor to General Controls Co., a corporation Application January 8, 1945, Serial No. 571,722

12 Claims. (Cl. 158—117.1)

This invention relates to a system for controlling a fuel burner, and particularly for ensuring that the system is in safe condition before the main fuel valve is opened.

In a prior application, filed in the name of William A. Ray on December 5, 1944, under Serial No. 566,662, and entitled: "Burner control system," a system of this general character is described and claimed. In that application, the sequence of operation begins with the opening of a valve for passing fuel to the pilot burner; then the energization of the igniting circuit takes place; then by the aid of a thermoelectric relay system, the pressure of the fuel on one side of a diaphragm is effective to operate a switch for deenergizing the ignition means, and after a short delay, for causing energization of an electromagnet to open the main valve. In the event of flame failure, the fluid pressure operated mechanism that controls the switch ensures a definite time delay before the ignition circuit can be reestablished, thereby permitting escape of unconsumed fuel from the furnace and preventing explosions.

The present system has the same general functions as that described in said prior application; but these functions are obtained in a different manner.

It is accordingly one of the objects of this invention to provide a simple system of this general character.

It is another object of this invention to provide a system in which the electrical circuits are simplified, and especially by the provision of a fluid pressure operated main valve, controlled to secure the desired sequence of operation, and the requisite time intervals between the steps of the cycle.

The system depends for its operation upon a relay energized when the pilot burner flame is in existence. This may be accomplished by the aid of a thermocouple or other device which serves to transmit electrical energy to the relay when heat is applied to the device. While it is quite safe to assume that such a device will not falsely indicate the existence of a pilot flame when there is none, there is no great assurance that the relay will certainly return to an inactive position when it is deenergized.

It is accordingly another object of this invention to ensure that the cycle of operations for opening the main valve, such as the act of energizing the igniter, cannot begin until the relay is returned to its deenergized position, and the gases in the burner chamber have been purged.

This result is accomplished by controlling the fluid pressure mechanism that operates the main valve, in accordance with the position of the relay; and in turn, by ensuring against energization of the igniting circuit unless the main valve is closed, and this latter condition can result only when the relay returns to inactive position. Accordingly, in the event that the relay remains stuck in the energized position, ignition of the fuel cannot occur. If this condition is rectified, the main valve closes, and the cycle of operations may start; but, since the act of closing the valve is retarded, the gases that may have collected are dissipated from the region of the burner before the igniter is energized.

It is still another object of this invention to make it possible to ignite the system manually, as by a match, in the event there is a failure of the power system supplying energy to the igniter, while yet ensuring that safe conditions must exist in order to maintain the main valve open. This is rendered possible by a manually operated mechanism that holds the pilot burner valve open, and yet that ensures return of the system to automatic operation just as soon as the power interruption ceases.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 1:
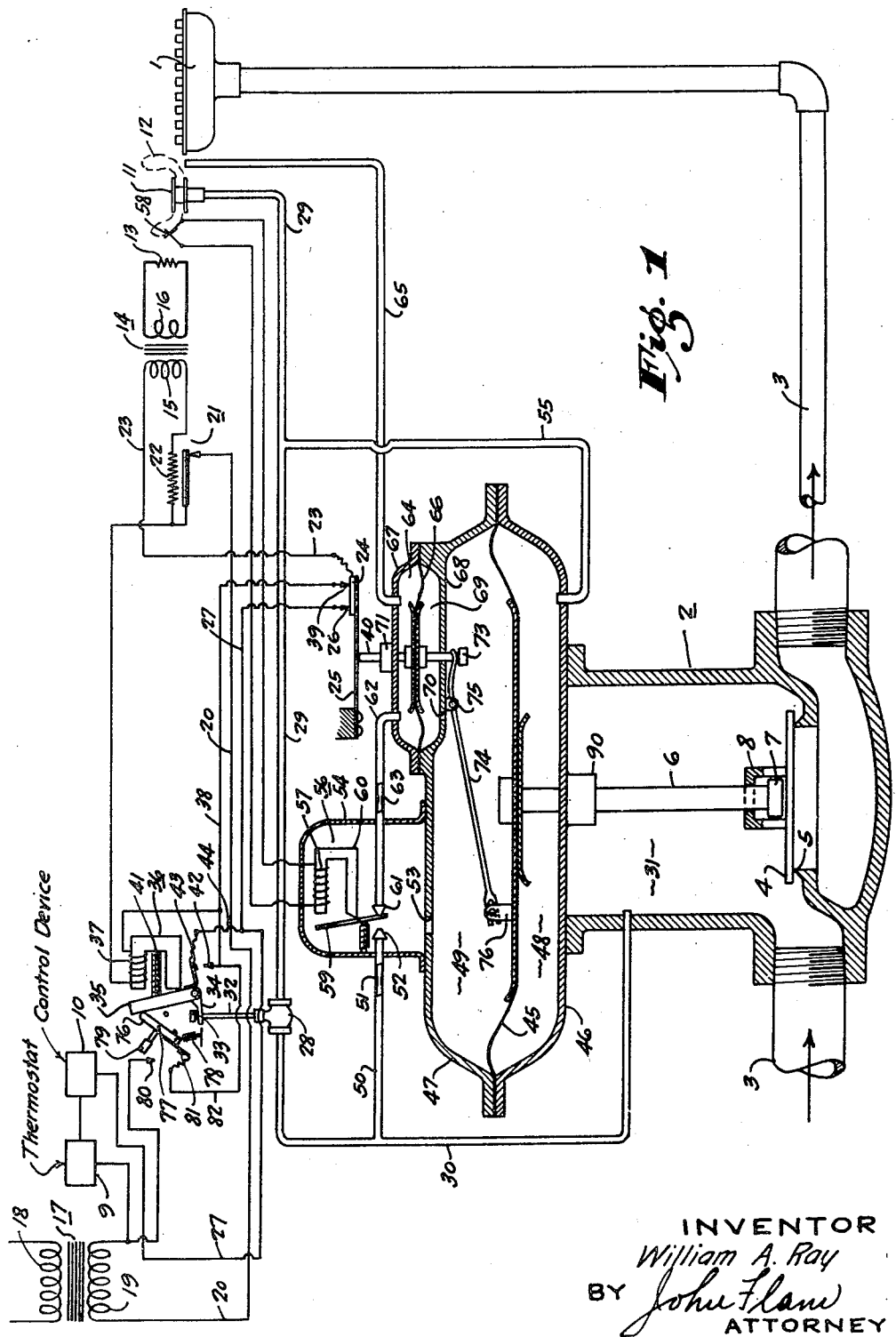
Figure 1 is a diagram of a system incorporating the invention, the main fuel valve being in inactive position.

The system, in this instance, is shown as applied to the control of a main gas burner 1. The flow of fuel through this gas burner is controlled by a valve structure 2, interposed in a fuel conduit 3.

The valve 2 includes a closure 4 adapted to rest upon a seat 5. The closure is arranged to be lifted from its seat by the aid of a stem 6. A lost motion connection for a purpose to be hereinafter described is provided between the closure 4 and the stem 6. This lost motion connection is provided, in the present instance, by strap 8 attached to the closure 4, through which stem 6 is slidable. The stem 6 carries a head 7 adapted, upon sufficient upward movement of stem 6, to engage the lower surface of the strap 8.

The main burner 1 is intended to be ignited in response to temperature conditions in a space to be heated. Such a response may be further controlled, as, for instance, to occur within a definite time. For example, a thermostat 9 and a clock or other limiting control 10 may be arranged jointly to control the operation of the burner 1. Within the time limits imposed by the timing device 10, temperature variations in the space to be controlled initiate a cycle for first igniting a pilot burner 11 and then for opening the valve 2 so that the burner 1 may be lighted by the pilot flame 12, shown in dotted lines in Fig. 1.

Ignition of the pilot flame 12 is effected by the aid of an igniter in the form of a glow coil 13. This glow coil 13 is shown as supplied with electrical energy by the aid of a step-down transformer 14 having a primary winding 15 and a secondary winding 16. This transformer is of the constant current type, in which the current flowing through the secondary winding 16 is limited, ensuring against subjection of the glow coil 13 to destructive high temperatures.

Energization of the transformer 14 is effected through a step-down power transformer 17 (shown in the upper left-hand corner of Fig. 1). The primary winding 18 of this transformer may be connected in any appropriate manner to a source of electrical energy. The secondary winding 19 may supply an energizing current to the primary winding 15 of the ignition transformer, but only in the event the main valve 2 is closed, and in the event the element 9 demands more heat, and timer 10 has not independently opened the circuit. When these conditions obtain, the circuit for the primary winding 15 is completed as follows: from the left-hand terminal of the secondary winding 19, conductor 20, a thermal overload switch 21, electric heater 22 for the safety switch 21, winding 15, connection 23, contact 24 on a movable contact arm 25, contact point 26, connection 27, elements 10 and 9, to the right-hand terminal of winding 19.

The safety switch 21 is of the type which opens in response to heat transmitted to it by the heating element 22, and which must be returned to closed position even after the temperature is reduced. The heating element 22, however, must be energized for an appreciable period before the switch can open. This safety switch prevents continued energization of any of the control circuits in the event the igniter fails to light the pilot burner 11 and continues to draw current through the circuit just traced. Normally, shortly after burner 1 is lighted, this ignition circuit is automatically disconnected at contacts 24, 26 in a manner to be hereinafter described.

The movable arm 25, included in the circuit energizing the igniter 13, is shown in this instance as a spring arm urged to move away from the contact 26 but urged into the contacting position by a rod or stem 40. This rod or stem 40 is so arranged, as will be hereinafter described, that it urges the arm 25 to the closed position only when the main valve 2 is closed. In this way, it is ensured that the igniter 13 will be operative only for a period slightly longer than required to ignite the pilot burner 11 which, in turn, serves to ignite the burner 1.

In order to supply fuel to the pilot burner 11, use is made of a valve 28 which is opened at the same time as the igniter 13 is energized. This valve 28 is located in a conduit 29 that leads, by way of conduit 30, to a space 31 in the body of valve 2 above closure 4 and in communication with the inlet side of the valve.

For operating the pilot burner valve 28, use is made of a valve stem 32 having a head 33. This head 33 may be engaged by a fork or arm 34 carried by the pivoted armature 35 of a relay 36. The energizing coil 37 of this relay has its circuit completed as follows: from the left-hand terminal of winding 19, conductor 20, safety switch 21, coil 37, connection 38, contact point 39, contact member 24, contact point 26, connection 27, controlling members 10 and 9, to the right-hand terminal of the coil 19. A compression spring 41 urges the armature 35 to the open position when the coil 37 is de-energized.

Again, the main valve 2 must be closed before this circuit operating the pilot burner valve 28 can be energized, for the spring arm 25 must be urged upwardly to the position indicated in Fig. 1 by the stem 40. However, as soon as armature 35 is attracted, a holding circuit is completed, by-passing contact points 39 and 26. This holding circuit can be traced as follows: from the left-hand terminal of winding 19, conductor 20, safety switch 21, coil 37, contact point 42, contact arm 43, connection 44, thence by way of connection 27 and members 10 and 9 to the right-hand terminal of winding 19.

In the event the igniter 13 fails, after an interval, to ignite the pilot burner 11, the entire system is rendered inactive by opening of the safety switch 21. On the other hand, if the system functions normally, then the pilot burner flame 12 is established, and the main valve closure 4 can be safely lifted to pass fuel to the burner 1. How this is automatically effected will now be described.

The stem 6 has its upper end attached to a flexible diaphragm or wall 45. This wall 45 is disposed in a casing having a lower portion 46 and the upper portion 47. The edge of the diaphragm 45 is sealed between these two portions 46 and 47. The lower portion 46 is supported on the valve 2, and provides an upper wall for space 31 above closure 4. Furthermore, the diaphragm 45 separates the space in the casing into two chambers 48 and 49. The stem 6 passes through a sealing device 90 to prevent the escape of fuel past the stem 6 and yet to permit the stem 6 to be raised when the fluid pressure in lower chamber 48 overpowers the fluid pressure in the chamber 49.

In the inactive position, inlet pressure is effective in the upper chamber 49 through connections 30 and 50, through a restricted port 51, a jet 52, and an aperture 53 in the upper portion 47 of the casing. A fluid-tight supplementary housing 54 is supported on the upper portion 47 of the diaphragm housing. It serves to enclose the jet 52 and to prevent escape of fuel from it to the atmosphere. Also, the lower chamber 48 is vented to the atmosphere through the conduit 55, which is connected to the pilot burner conduit 29 and which, therefore, is in communication with the atmosphere while the pilot burner 11 is unlighted.

As soon as the stem 32 of the pilot burner valve 28 is raised, the lower chamber 48 is subjected to inlet pressure through conduit 30, pilot burner valve 28, conduit 29, and conduit 55. However, the diaphragm 45 remains in the lower position illustrated in Fig. 1 because of the weight of the stem 6 which is imposed upon the diaphragm.

In order to cause the valve 2 to open, a relay structure 56 is operated. This structure is located in the housing 54. The coil 57 of this relay structure is energized by a thermoelectric generator indicated as the thermocouple 58. The hot junction of this thermocouple is arranged to be heated by the pilot flame 12. In a short interval after the pilot flame 12 is established, the relay 56 is energized sufficiently to attract a light armature 59, spring biased to unenergized position. This armature is pivoted adjacent the lower edge of the relay core 60. The lower end of the armature 59, when this armature is attracted by relay core 60, serves to close the jet 52 and to open a jet 61. This jet 61 is connected to a conduit 62 in which there is a restricted orifice 63. Accordingly, passage of fuel to the upper chamber 49 is interrupted by the closing of the jet 52; and, at the same time, jet 61 is uncovered to reduce the pressure in upper chamber 49 as through a chamber 64 and a venting conduit 65 leading to a place near the main burner 1, where the small amount of fuel escaping from chamber 49 is consumed.

Figure 2:
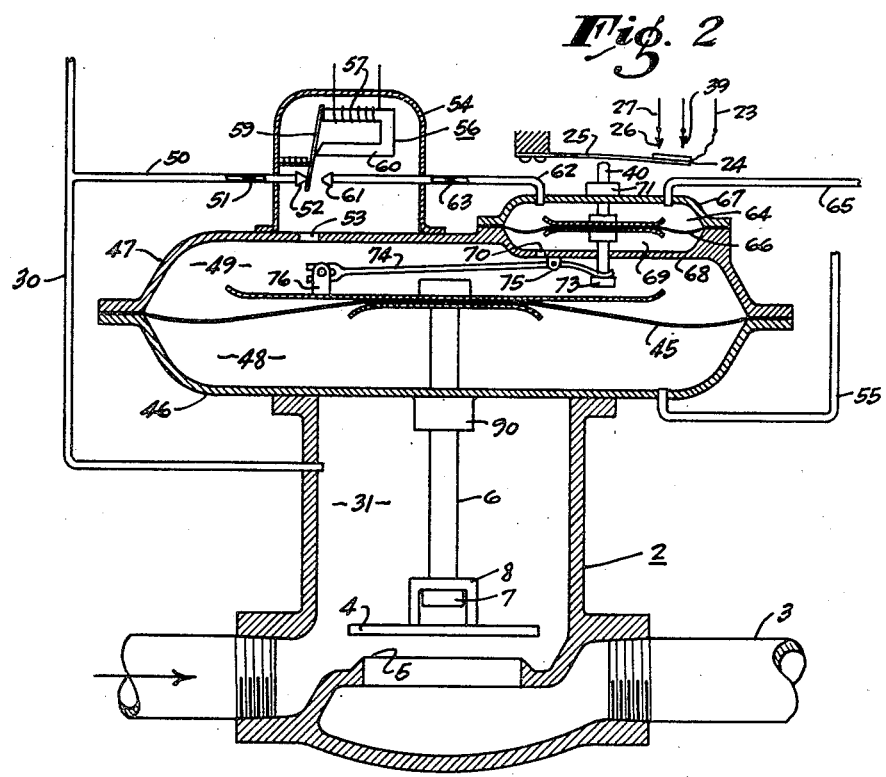
Fig. 2 is a view illustrating the running position of the main valve.

When this occurs, the diaphragm 45 rises slowly, since the pressure of chamber 49 is slowly released past the restricted orifice 63. The fully raised position of diaphragm 45 is illustrated in Fig. 2. In this position all the lost motion has been taken up at strap 8 by head 7, and closure 4 is raised from the seat 5.

The spring arm 25 is also lowered by withdrawal of rod 40, to cause disengagement of the contact member 24 with contacts 26 and 39. This causes de-energization of the circuit of igniter 13. This de-energization takes place before the valve closure 4 is raised. Operating the rod 40 is a supplemental diaphragm 66, having its edge disposed between an upper housing member 67 and a shoulder disposed around a depressed portion 68 of the upper casing member 47. The diaphragm 66 thus separates the space formed by member 67 into the upper chamber 64 and the lower chamber 69. This lower chamber 69 is in communication with chamber 49, as by the aid of an aperture 70.

In the closed position of Fig. 1, the upper chamber 64 is vented through the vent 65, but the lower chamber 69 is subjected to the same pressure as chamber 49; and, accordingly, the diaphragm 66 is urged upwardly to move the arm 25 to circuit closing position. However, when chamber 49 is vented through jet 61, conduit 62, and vent 65, the rod 40 is free to move away from the arm 25. The rod 40 is guided through sealing guide 71. It is also provided at its lower end with a head 73. This head 73 has a special function which will now be described.

As the diaphragm 45 rises to open the valve 2, the valve does not immediately open, due to the slow release of pressure through the orifice 63, and due to the lost motion connection between the stem 6 and closure 4. It is desirable that the arm 25 be permitted to move to the open position of Fig. 2 before the valve 2 opens, thereby ensuring that there be a delay between the time that the ignition circuit is broken and the main burner is lighted. This is accomplished, first of all, by the slow movement of the diaphragm 45 to its valve opening position. An interlock is also provided that positively pulls the rod 40 downwardly as the diaphragm 45 moves upwardly. This includes an arm 74 pivoted by the aid of an ear 75 attached to the lower side of the depressed portion 68. The left-hand end of the arm 74 is joined, as by a slot and pin connection, to the ear 76 mounted on diaphragm 45. The right-hand portion is arranged to engage the upper surface of head 73. As the diaphragm 45 continues to move upwardly, arm 74 is rotated in a clockwise direction about its pivot and the head 73 is urged downwardly by the arm.

In the event of flame failure, the relay 56 releases the armature 59 to the position of Fig. 1. When this occurs, a definite time delay must occur before the igniter 13 may be again energized. In this way, the danger of igniting a collection of unburned fuel in the furnace chamber is obviated, since the delay is sufficient to purge the fuel from the furnace. The time delay is secured by slowly building up the pressure in the space 49 through the restricted orifice 51. The travel of the diaphragm 45 to the position of Fig. 1 is correspondingly slow. Furthermore, the valve 2 must be entirely closed before the interlock arm 74 has moved far enough to permit rod 40 to urge the arm 25 to the closed position of Fig. 1. The diaphragm 45 must be practically at its lowermost position before the igniter circuit and the circuit for the relay 36 is reestablished by arm 25.

In normal operation, when no heat is demanded by members 9 and 10, the circuit through these members is opened and the relay 36 returns the armature 35 to the inactive position, causing pilot valve 28 to close. The pilot burner 11 is then extinguished, and the system returns to the inactive position shown in Fig. 1.

Should there be a momentary current interruption through transformer 17, the relay 36 is de-energized. The pilot burner valve 28 is closed, extinguishing the pilot burner 11. However, due to thermal lag, the thermocouple 58 continues for a while to supply sufficient energy to the relay 56 to keep the relay in the active position of Fig. 2. After a while, the thermocouple 58 cools off sufficiently to return the diaphragms 45 and 66 to the position indicated in Fig. 1, and ignition can then be re-established if the current interruption has ended.

Until diaphragm 45 approaches its lowermost position, and until the pressure in chamber 49 builds up sufficiently to urge the diaphragm 66 to the position of Fig. 1, the ignition circuit remains unenergized. But pressure in chamber 49 cannot be built up until the relay 56 is deenergized. This obviates the possibility of the initiation of an igniting cycle should the relay 56 stick. Accordingly, until the relay 56 is attended to and returned to operation, the ignition circuit and the circuit for opening the valve 28 are inactive.

A continued interruption in the supply of power to the transformer 17 might occur. In this event, provisions are made to permit manual ignition of the main burner 1 without the aid of the igniter 13. Thus, a manually operated device may be arranged to urge the armature 35 of relay 36 in a clockwise direction, causing pilot burner valve 28 to open. When this occurs, a match or other lighted element may be applied to the pilot burner 11; and, when it is lighted, the flame 12 being established, the system operates as heretofore described to cause ultimately the opening of the main valve 2.

Figure 3:
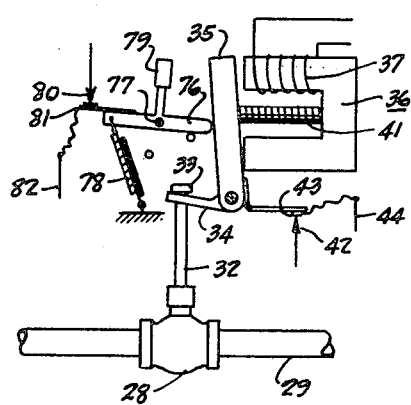
Fig. 3 is an enlarged diagrammatic view of a manually operated device that may be utilized in the event of power failure.

The armature 35 is retained in the valve opening position. As illustrated in Fig. 3, the lever 76, angularly movable about the pivot 77, is so arranged that it may be rocked in a clockwise direction against the force of a spring 78, as by a hand knob 79. It is retained in this position by the pressure exerted upon the arm 76 by armature 35 and spring 41. The lever 76 is in a position past that in which armature 35 is urged closest to the core of relay 36. Accordingly, this armature is separated from the core by a small gap. The torque operating on lever 76 through armature 35 opposes that exerted by spring 78, and is sufficient to hold the lever in the position of Fig. 3. However, means are provided to release the arm 76 just as soon as the current is re-established, by energizing relay 36 and retracting armature 35 from its holding position. For this purpose, use is made of the stationary contact member 80 and a movable contact member 81 mounted on arm 76. These are brought into engagement when the arm 76 is moved to the position indicated in Fig. 3. Accordingly, when the power is re-established, the circuit through the relay coil 37 is completed through connection 20, safety switch 21, coil 37, connection 82, contacts 81 and 80, and connection 83 to the right-hand terminal of winding 19. When this circuit is established, armature 35 is pulled toward the right to the fully attracted position by the relay 36, and arm 76 returns to the position of Fig. 1. In this position, if the thermostat 9 and member 10 are in such a position as not to demand any heat, the system is de-energized, and returns to the position of Fig. 1. Then the system may thereafter operate automatically as hereinabove described.

The inventor claims:

1. In a system of the character described, a fuel burner, an electrically energizable igniter for the burner, a valve for controlling the burner, switch means including a pair of contacts, a fluid pressure mechanism controlled by the fuel supply pressure for operating said valve and said switch means, a control circuit including a control device and said contacts for rendering said igniter active, and means responsive to the existence of a flame at the pilot burner for causing said pressure controlled mechanism to operate the valve to pass fuel to the burner and to render said igniter inactive.

2. In a system of the character described, a main burner, a pilot burner, fuel supply means for the burners, an electrically energizable igniter for the pilot burner, a main burner valve, a pilot burner valve, switch means including a pair of contacts, a fluid pressure mechanism controlled by the fuel supply pressure for operating said main burner valve and said switch means, means for operating said pilot burner valve, a control circuit including a control device and said contacts for rendering said igniter active and for causing the means operating the pilot burner valve to pass fuel to the pilot burner, and means responsive to the existence of a flame at the pilot burner for causing said pressure controlled mechanism to operate the main burner valve to pass fuel to the main burner and to render said ignition inactive.

3. In a system of the character described, a main burner, a main burner valve having a closure, means forming a pair of fluid pressure chambers and including a movable wall separating the chambers, a connection between said wall and the closure, a pilot burner, a pilot burner valve, an igniter for the pilot burner, means for electrically operating the pilot burner valve and the igniter, means responsive to the existence of a flame at the pilot burner for controlling the fluid pressure in the chambers for causing the movable wall to open the main valve, and fluid pressure operated means for deenergizing the igniter and controlled by the means that is responsive to the existence of a flame at the pilot burner.

4. In a system of the character described, a main burner, a main burner valve having a closure, means forming a pair of fluid pressure chambers, including a movable wall separating the chambers, a connection between said wall and the closure, a pilot burner, a pilot burner valve, an igniter for the pilot burner, means for electrically operating the pilot burner valve and the igniter, means responsive to the existence of a flame at the pilot burner for controlling the fluid pressure in the chambers for causing the movable wall to open the main valve, said means for controlling the fluid pressures including restricted ports to introduce a delay in opening and closing the valve, said closure and the movable wall having a lost motion connection requiring substantial movement of the wall toward opening position before the closure is moved from its seat, and means for deenergizing the igniter and operating in response to the motion of the wall toward valve opening position.

5. In a system of the character described, a fuel valve, a fuel burner controlled by the valve, a source of fuel supply for the burner, means forming a pressure chamber, including a movable wall, a movable valve closure for the wall, a connection between the wall and the closure for moving the closure to open or closed position by corresponding movement of the wall, means for conducting fuel under pressure into the chamber for urging the wall toward valve closing position, means for venting the chamber, means for moving the wall to valve opening position, an electrically energized igniter operatively associated with the burner, a circuit controller for the igniter, and a mechanical connection between the wall and the circuit controller for preventing energization of the igniter until the wall has moved to a valve closing position.

6. In a system of the character described, a fuel valve, a fuel burner controlled by the valve, a source of fuel supply for the burner, means forming a pressure chamber, including a movable wall, a movable valve closure for the wall, a connection between the wall and the closure for moving the closure to open or closed position by corresponding movement of the wall, means for conducting fuel under pressure into the chamber for urging the wall toward valve closing position, means for venting the chamber, means for moving the wall to valve opening position, said conducting and venting means having restricted passageways to delay opening and closing of the valve, an electrically energized igniter operatively associated with the burner, a circuit controller for the igniter, and a mechanical connection between the wall and the circuit controller for preventing energization of the igniter until the wall has moved to a valve closing position.

7. In a system of the character described, a fuel valve, a fuel burner controlled by the valve, a source of fuel supply for said burner, means forming a pressure chamber having a pair of portions separated by a movable wall, a connection between the wall and the valve whereby movement of the wall in one direction can cause the valve to open, and movement in the opposite direction can cause the valve to close, means for conducting fuel under pressure into one of said chamber portions while the other portion is vented to cause the wall to move in valve opening direction, means for venting said one chamber portion and for admitting fuel under pressure to said other portion to cause said wall to move in valve closing direction, an electrically energizable igniter operatively associated with the burner, a circuit controller for the igniter, and a second movable wall, joined to the circuit controller, whereby movement of said second wall operates said circuit controller, said second wall being subjected to the pressure in said other portion of said chamber, whereby to urge the circuit controller to move in a direction to cause energization of the igniter when the pressure conditions in said chamber portions are such as to produce a movement of the first mentioned movable wall to close said valve.

8. In a system of the character described, a fuel valve, a fuel burner controlled by the valve, a source of fuel supply for said burner, means forming a pressure chamber having a pair of portions separated by a movable wall, a connection between the wall and the valve whereby movement of the wall in one direction can cause the valve to open, and movement in the opposite direction can cause the valve to close, means for conducting fuel under pressure into one of said chamber portions while the other portion is vented to cause the wall to move in valve opening direction, means for venting said one chamber portion and for admitting fuel under pressure to said other portion to cause said wall to move in valve closing direction, an electrically energizable igniter operatively associated with the burner, a circuit controller for the igniter, a second movable wall, joined to the circuit controller, whereby movement of said second wall operates said circuit controller, said second wall being subjected to the pressure in said other portion of said chamber, whereby to urge the circuit controller to move in a direction to cause energization of the igniter when the pressure conditions in said chamber portions are such as to produce a movement of the first mentioned movable wall to close said valve, and a mechanical connection between the first wall and the second wall, of such character as to prevent movement of said second wall to a position for causing energization of the igniter until said first wall reaches valve closing position.

9. In a system of the character described, a burner, an electrically energizable igniter for the burner, a valve for the burner, electrically energizable means having a member moved by energization of said means from a deenergized position to an energized position for opening said valve and rendering the igniter active and resiliently urged toward deenergized position, means manually operable to an actuating position for moving said member toward energized position to open the valve and to energize the igniter, means resiliently urging said manually operable member from actuating position, and switch means, operated by movement of said manually operable means to actuating position, to cause energization of said electrically energizable means, said member, when said electrically energizable means is deenergized cooperating with said manually operable means to maintain said manually operable means in actuating position upon movement of said means to said actuating position, and releasing said manually operable means upon energization of said electrically energizable means.

10. In a system of the character described, a burner, an electrically energizable igniter for the burner, a valve for the burner, electrically energizable means having a member moved by energization of said means from a deenergized position to an energized position for opening said valve and rendering the igniter active and resiliently urged toward deenergized position, means manually operable to an actuating position for moving said member toward energized position to open the valve and to energize the igniter, means resiliently urging said manually operable member from actuating position, condition responsive means effective to control the supply of electrical energy to said electrically energizable means, and means operated by said manually operable means when in actuating position to cause energization of said electrically energizable means independently of said condition responsive means.

11. In a system of the character described, a main burner, a pilot burner, fuel supply means for said burners, an electrically energizable igniter for the pilot burner, a main burner valve, a pilot burner valve, electrically energizable means having a member moved by energization of said means from a deenergized position to an energized position for opening the pilot burner valve and rendering the igniter active, and resiliently urged toward deenergized position, means responsive to the existence of a flame at the pilot burner for causing the main valve to open, and to render the igniter inactive, and means manually operable to an actuating position, and resiliently urged from said actuating position, for moving said member toward energized position to open the pilot burner valve and to render the igniter active, as well as to energize said electrically energizable means, said member, where said electrically energizable means is deenergized cooperating with said manually operable means to maintain said manually operable means in actuating position upon movement of said means to said actuating position, and releasing said manually operable means when said electrically energizable means is energized.

12. In a system of the character described, a main burner, a pilot burner, fuel supply means for said burners, an electrically energizable igniter for the pilot burner, a main burner valve, a pilot burner valve, electrically energizable means having a member moved by energization of said means from a deenergized position to an energized position for opening the pilot burner valve and rendering the igniter active, and resiliently urged toward deenergized position, means responsive to the existence of a flame at the pilot burner for causing the main valve to open, and to render the igniter inactive, means manually operable to an actuating position and resiliently urged from said actuating position, for moving said member toward energized position to open the pilot burner valve and to render the igniter active, said member, when said electrically energizable means is deenergized cooperating with said manually operable means to maintain said manually operable means in actuating position upon movement of said means to said actuating position, and releasing said manually operable means when said electrically energizable means is energized, condition responsive means effective to control the supply of electrical energy to said electrically energizable means, and means operated by said manually operable means when in actuating position to cause energization of said electrically energizable means independently of said condition responsive means.

WILLIAM A. RAY.

REFERENCES CITED

The following references are of record in the file of this patent:

UNITED STATES PATENTS

| Number | Name | Date |
|---|---|---|
| 1,821,512 | Hasting | Sept. 1, 1931 |
| 1,855,551 | Jackson | Apr. 26, 1932 |
| 1,975,656 | Irvin | Oct. 2, 1934 |
| 2,029,615 | Gille | Feb. 4, 1936 |
| 2,056,414 | Whalen | Oct. 6, 1936 |
| 2,169,696 | Hotchkiss | Aug. 15, 1939 |
| 2,228,588 | Ray | Jan. 14, 1941 |
| 2,261,092 | Peterson | Oct. 28, 1941 |
| 2,268,959 | Ray | Jan. 6, 1942 |
| 2,300,156 | Higley | Oct. 27, 1942 |
| 2,305,243 | English | Dec. 15, 1942 |